July 23, 1968 C. JONES 3,393,667

ROTARY COMBUSTION ENGINE WITH DUAL IGNITION DEVICES

Filed Jan. 19, 1967 6 Sheets-Sheet 1

INVENTOR.
CHARLES JONES
BY William V. Elsa
his ATTORNEY

ROTARY COMBUSTION ENGINE WITH DUAL IGNITION DEVICES

Filed Jan. 19, 1967 6 Sheets-Sheet 2

INVENTOR.
CHARLES JONES
BY William V. Ebs
his ATTORNEY

ROTARY COMBUSTION ENGINE WITH DUAL IGNITION DEVICES

Filed Jan. 19, 1967 6 Sheets-Sheet 3

INVENTOR.
CHARLES JONES
BY
William V. Ebs
his ATTORNEY

INVENTOR.
CHARLES JONES
BY
William V. Ebs
his ATTORNEY

ROTARY COMBUSTION ENGINE WITH DUAL IGNITION DEVICES

Filed Jan. 19, 1967 6 Sheets-Sheet 5

INVENTOR.
CHARLES JONES
BY William V. Ebs
his ATTORNEY

July 23, 1968 C. JONES 3,393,667

ROTARY COMBUSTION ENGINE WITH DUAL IGNITION DEVICES

Filed Jan. 19, 1967 6 Sheets-Sheet 6

INVENTOR.
CHARLES JONES
BY
William V. Ebs
his ATTORNEY 3,393,667
ROTARY COMBUSTION ENGINE WITH DUAL IGNITION DEVICES
Charles Jones, Hillsdale, N.J., assignor to Curtiss-Wright Corporation, a corporation of Delaware
Filed Jan. 19, 1967, Ser. No. 610,261
10 Claims. (Cl. 123—8)

ABSTRACT OF THE DISCLOSURE

A rotary combustion engine having the capability of operating on a wide variety of fuels is provided with dual ignition devices which are located in close proximity to a fuel nozzle and simultaneously fired upon the injection of fuel to initiate combustion without detonation, the construction of the engine, particularly in the region of the fuel nozzle and ignition devices, being such that the engine may be efficiently air-cooled.

Summary of the invention

The invention is directed to a rotary combustion engine of the type shown, for example, in U.S. Patent No. 3,246,636 issued Apr. 19, 1966, that is a rotary combustion engine wherein fuel is injected directly into the working chambers of the engine and which has the capability of operating on a wide variety of fuels. More particularly, the invention is directed to an engine of this type having dual ignition means for initiating combustion.

In the rotary combustion engine of this invention, dual ignition devices are provided to assure a highly reliable type of operation such as required in certain instances, as for example, in engines used to generate the propulsive power for an aircraft. Such dual ignition devices are located in the outer body peripheral wall of the engine in close proximity to a nozzle through which fuel is injected into the engine cavity, and are fired simultaneously upon the injection of fuel to prevent detonation. Efficient air cooling of the engine is rendered possible by arranging the nozzle and ignition devices to minimize the metal required to structurally support these parts in the outer body of the engine, by providing for the flow of cooling air throughout the region of the nozzle and ignition devices, by exposing the difficult-to-cool region of the outer body peripheral wall in which the fuel nozzle and ignition devices are located to freshly supplied cooling air, by judiciously locating the fuel nozzle and ignition devices with regard to temperature variations around the engine outer body, and by selecting the engine geometry suited to providing satisfactory operation without the generation of excessive heat.

The prime object of the invention is to provide an improved multi-fuel rotary internal combustion engine wherein the likelihood of a misfire is minimized by the provision of dual ignition means for simultaneously igniting injected fuel when introduced into the engine.

It is another object of the invention to so arrange and position dual ignition and fuel injection means in a multi-fuel rotary internal combustion engine and so construct the outer body of the engine as to render possible efficient air cooling of said engine.

Other objects and advantages of the invention will become apparent during a reading of the specification taken in connection with the accompanying drawings.

Detailed description

Figure 1:
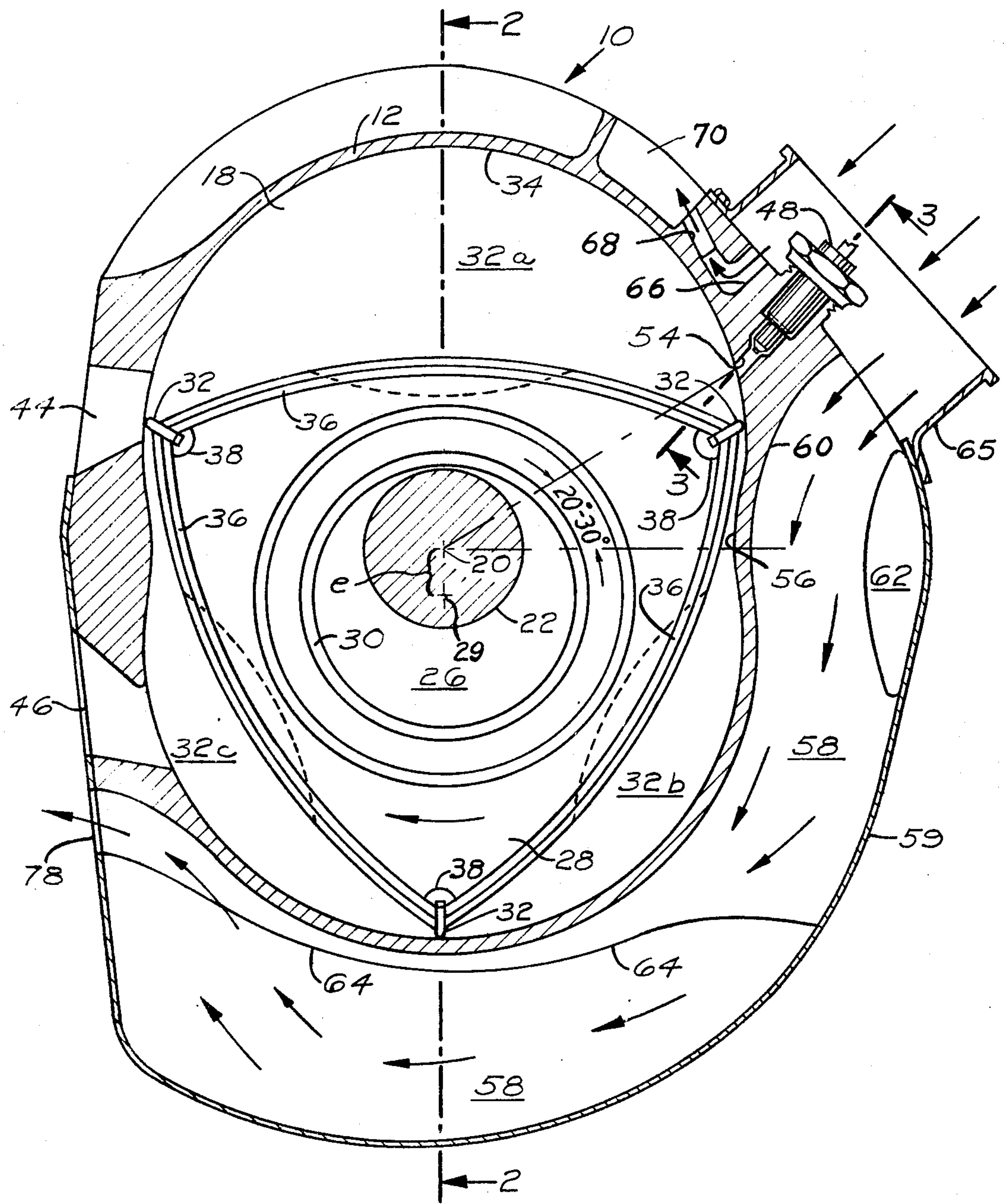
FIG. 1 is a transverse sectional view of the rotary combustion engine of the invention.
Figure 2:
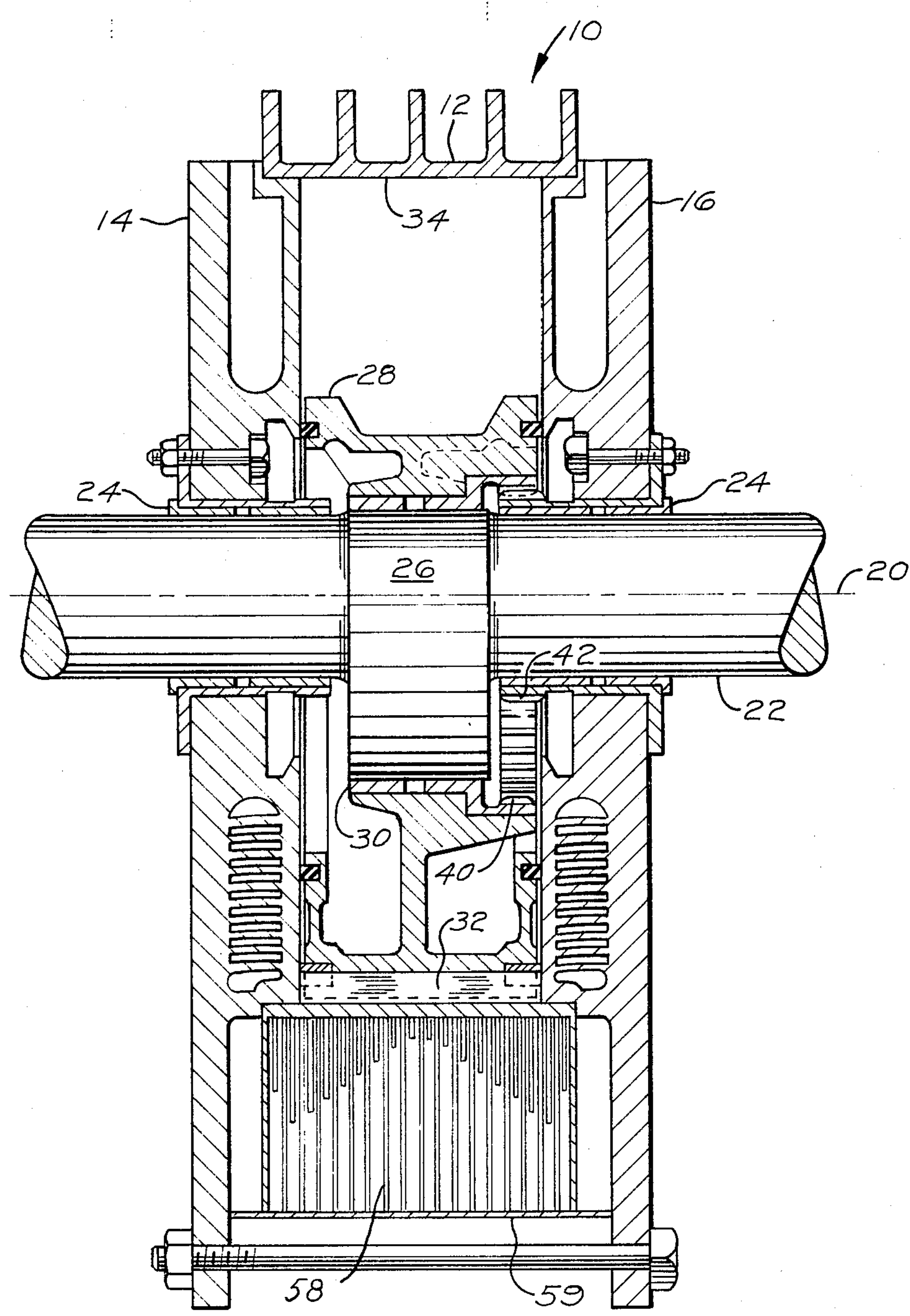
FIG. 2 is a vertical sectional view taken on the plane of the line 2—2 of FIG. 1.
Figure 4:
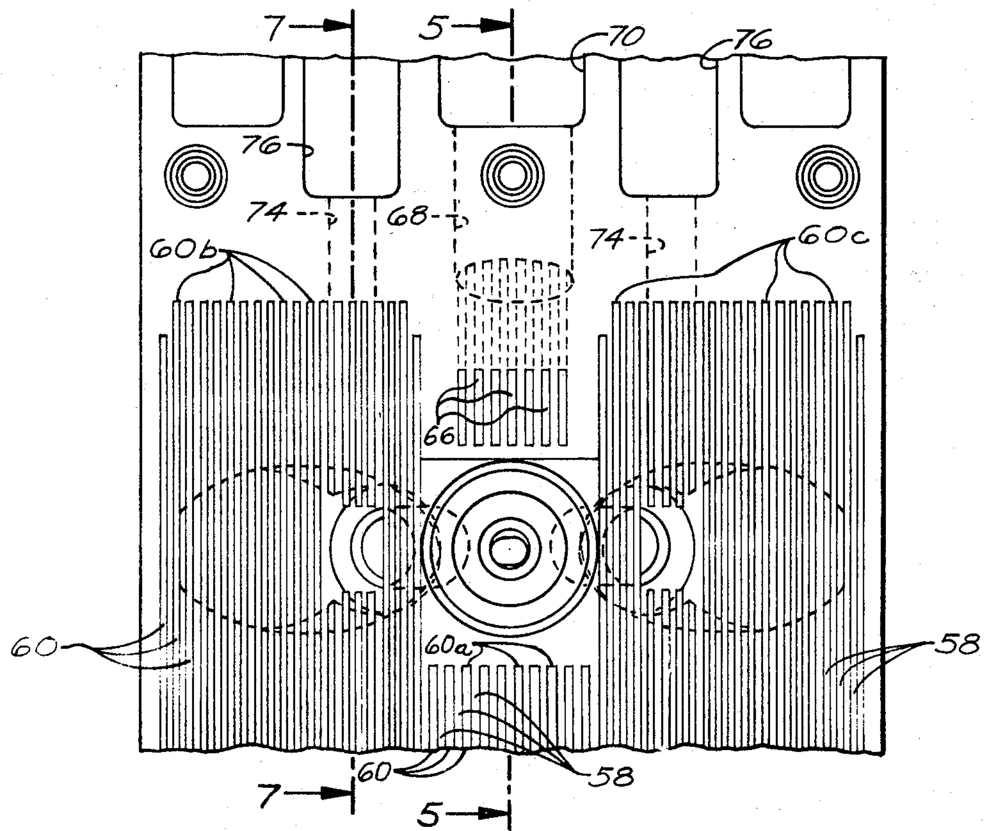
FIG. 4 is an enlarged fragmentary plan view of the outer body peripheral wall of the engine in the region adapted to receive a fuel nozzle and spark plugs.
Figure 3:
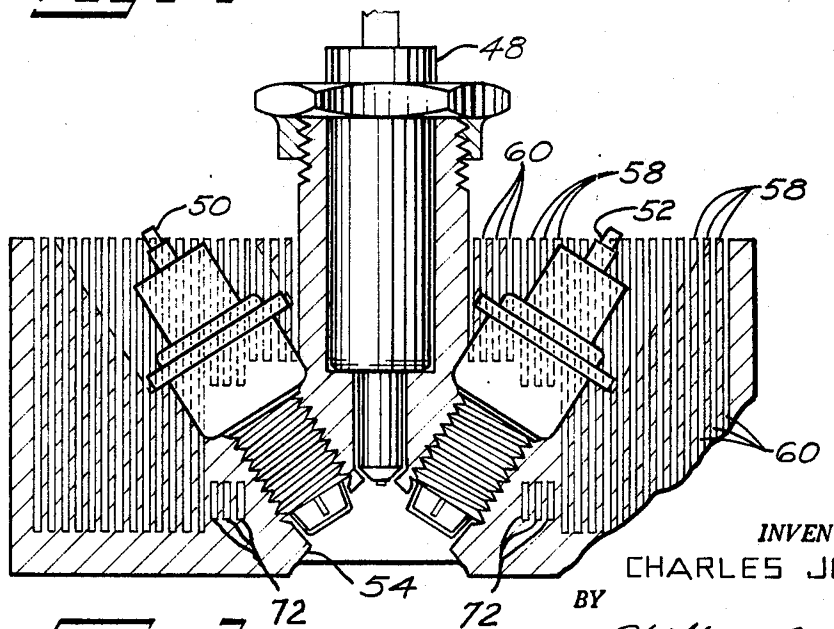
FIG. 3 is an enlarged sectional view taken on the plane of the line 3—3 of FIG. 1.
Figure 6:
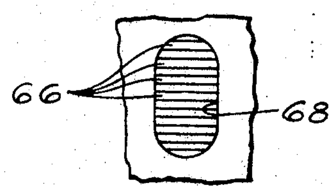
FIG. 6 is a view taken on the plane of the line 6—6 of FIG. 5.
Figure 5:
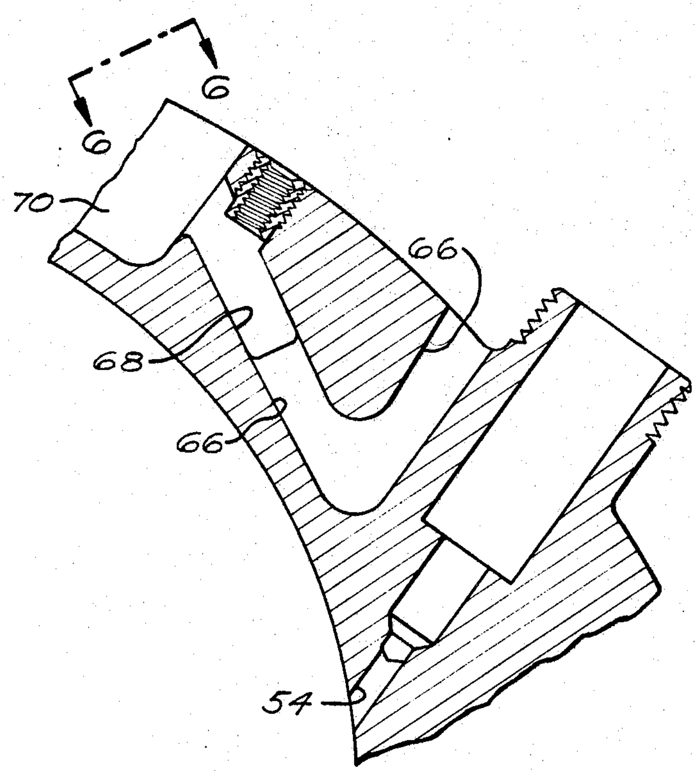
FIG. 5 is an enlarged fragmentary sectional view taken on the plane of the line 5—5 of FIG. 4.
Figure 7:
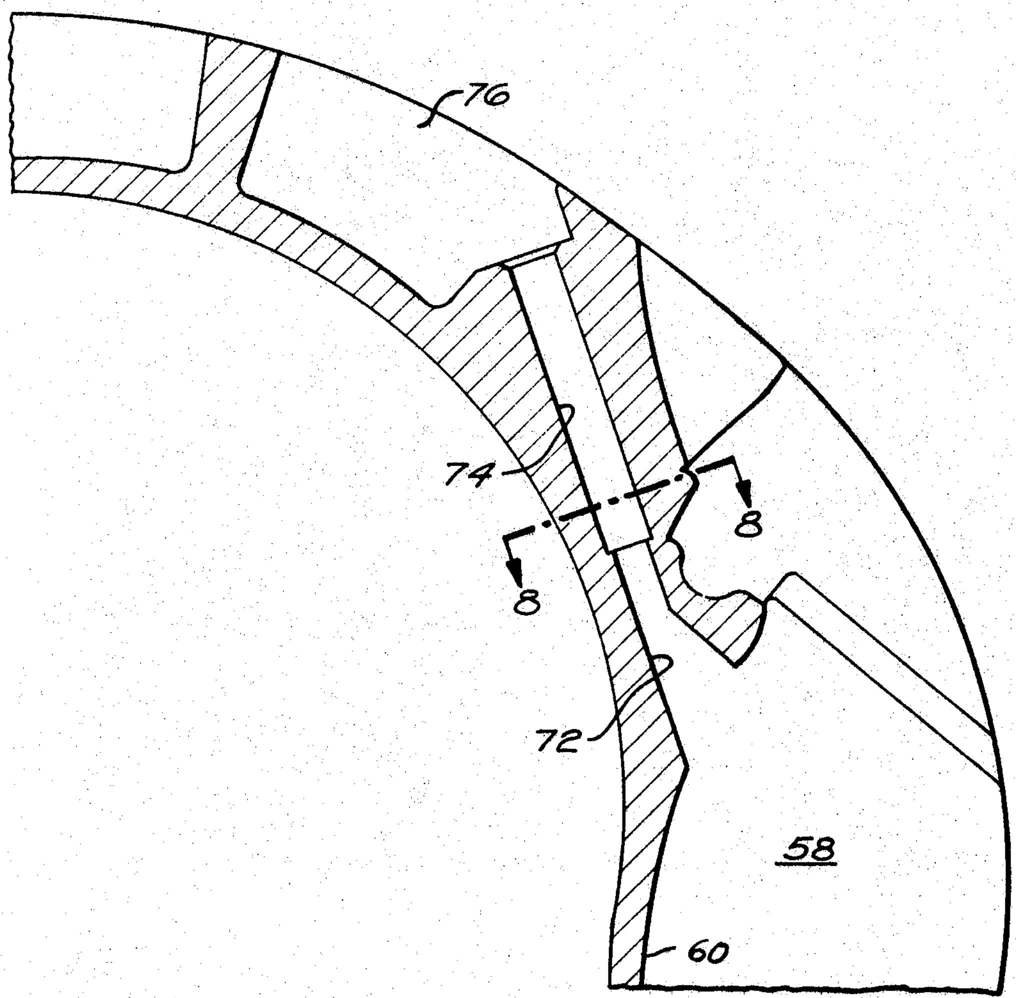
FIG. 7 is an enlarged fragmentary sectional view taken on the plane of the line 7—7 of FIG. 4.
Figure 9:
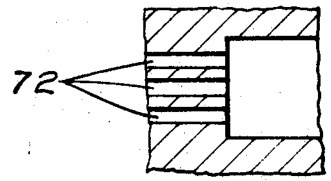
FIG. 9 is a sectional view taken on the plane of the line 9—9 of FIG. 8.
Figure 8:
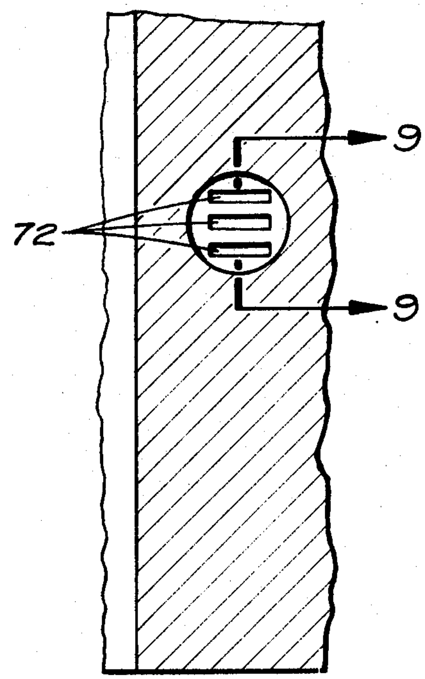
FIG. 8 is a sectional view taken on the plane of the line 8—8 of FIG. 7.

Referring to the drawings, reference character 10 designates a rotary combustion engine according to the invention. The engine 10 comprises an outer body having a peripheral wall 12 and interconnected ends walls 14 and 16. Such outer body defines the engine cavity 18, the outline of which in a plane perpendicular to the axis 20 of the engine shaft 22 is basically a two-lobed epitrochoid having its geometric axis coincident with the axis of shaft 22.

Shaft 22 is rotatably supported in the engine on suitable bearings 24 and has eccentric portion 26 formed thereon. Upon such eccentric portion 26 there is a rotor 28 having its geometrical axis 29 displaced a distance from the geometrical axis of the inner surface. As shown, the rotor 28 is rotatably supported by bearings 30. The rotor 28 has three circumferentially spaced apex portions and each carries a sealing strip 32 which engages the inner surface 34 of the peripheral wall 12 to form working chambers **32*a*, 32*b*, and 32*c* that vary in volume when the rotor is caused to turn within the engine cavity. Seals 36 mounted in the side faces of the rotor 28 engage the inside faces of end walls 14 and 16, and intermediate seal bodies 38 to provide a continuous seal between the rotor and end housings effective to prevent leakage from the working chambers around the ends of the rotor. As shown, the rotor carries an internally-toothed gear 40 which meshes with a gear 42 that is secured to end wall 16**. Such gearing serves to guide the rotor in the epitrochoidal path it is caused to follow upon operation of the engine.

An intake port 44 is provided in the peripheral wall 12 for admitting air to the engine cavity and an exhaust port 46 is provided in the wall 12 for expelling burnt gases from the engine. A fuel nozzle 48 is provided for injecting fuel into the working chambers and two spark plugs 50 and 52 are proxided for igniting the fuel spray. Combustion is initiated and the rotor 28 caused to turn in the cavity 18 upon the injection of fuel through nozzle 48 into a working chamber and ignition by the spark plugs 50 and 52. Each working chamber has an operating cycle comprising the four phases of intake, compression, expansion and exhaust and each such part of the operating cycle occurs adjacent the same portion of the outer body peripheral wall. Air is supplied to each of the working chambers in succession through intake port 44 as the rotor turns and burnt gases are exhausted from the chambers in succession through port 46. In each working chamber, fuel injection and combustion takes place during a predetermined period, fuel injection and ignition being initiated after the injection of air into the chamber while chamber volume is relatively small, but prior to the chamber reaching a minimum volume position, and being continued for a period of time after the minimum volume position has been attained.

The two spark plugs 50 and 52 have their electrodes in close proximity to the tip of the fuel nozzle and are fired simultaneously as by conventional aircraft ignition circuitry (not shown) to initiate combustion close to the nozzle. Not only is the likelihood of a misfire substantially lessened by using the two spark plugs rather than a single igniting device, but because of the disposition of the spark plugs in relation to the fuel nozzle and simultaneously firing of both spark plugs, detonation is prevented.

It is preferable that the engine be air-cooled because of the lighter weight of an air-cooled engine as compared to one which is liquid-cooled and the need for light weight dual ignition engine in aircraft. It is difficult to efficiently air-cool a rotary combustion engine which is adapted for fuel injection because of the obstruction presented to cooling air blown around the outer body peripheral wall of the engine by the mass of material required in the peripheral wall to support the fuel nozzle and any ignition device, and the problem is particularly severe in the case of a rotary combustion aircraft engine having dual ignition devices as in the engine of the invention because of the additional structure required to support the extra ignition device. Nevertheless, efficient air cooling is provided for by:

(1) Having the fuel nozzle 48 and two spark plugs 50 and 52 in close proximity in the outer body peripheral wall 12 with their ends extending into a small common recess 54 to thereby minimize the structure required to support such parts;

(2) Arranging the fuel nozzle 48 and spark plugs 50 and 52 in a plane parallel to the rotor axis rather than perpendicular to the axis so that cooling passages can be provided throughout the region of the fuel nozzle and spark plugs to cool this portion of the outer body of the engine;

(3) Supplying cooling air directly to passages surrounding the fuel nozzle and plugs from a conduit located above such fuel injection and ignition devices;

(4) Locating the fuel nozzle and spark plugs upstream from lobe junction 56 relative to the direction of rotation of the rotor 28, that is, on the cooler side of such lobe junction where the peripheral wall of the outer body is cooled to some extent by inducting air and satisfactory temperatures of the outer body can be more easily maintained; and (5) Selecting the engine geometry which, while suited to providing satisfactory operating conditions, limits the compression ratio to values such as to prevent the generation of excessive heat, such engine geometry being definable in terms of K, where $K=R/e$ (R being the distance from the geometrical axis 29 of the rotor to intersecting arcs of the rotor surface at any rotor apex, and $e$ being the distance between axis 20 and axis 29), and preferable values for K being within the range of 6.4 to 7.2.

As shown, the fuel nozzle 48 and spark plugs 50 and 52 are located in the outer body peripheral wall 12 in a plane parallel to the axis of the rotor with the nozzle between the spark plugs and the spark plugs each disposed at an acute angle relative to the nozzle. The fuel nozzle 48 and the spark plugs 50 and 52 all extend through the peripheral wall into the recess 54 which is preferably no greater in volume than 8% of the minimum volume of a working chamber including such recess. Within the recess which diverges in the said plane parallel to the rotor axis, the discharge end of the fuel nozzle and the electrodes of the spark plugs are in close proximity as indicated.

In regions of the outer body other than at the fuel nozzle 48 and spark plugs 50 and 52, the engine is structured for air-cooling substantially as disclosed in U.S. Patent 3,289,650 of Max Bentele et al. for Improvements in Air-Cooled Rotary Combustion Engine, issued Dec. 6, 1966. Thus, the outer body peripheral wall 12 is provided with a plurality of closely spaced cooling fins 58 extending circumferentially within a housing 59 from the region of the fuel nozzle and spark plugs in the direction of rotation of the rotor to a point adjacent the exhaust port in order to form passages 60 through which air may be caused to flow around the wall 12 toward the exhaust port. The velocity and quantity of air-flow through such passages 60 is regulated as in the manner described in the said U. S. Patent 3,289,650 by reducing the cross-section of the passageways with plates 62 and by selectively cropping some of the fins 58 in regions of relatively low heat input as at 64.

In the region of the fuel nozzle and spark plugs, the outer body is formed with passages which surround these parts and cooling air is blown directly into such passages from air-supply conduit 65 (see FIGS. 3 through 9). As shown, passages 60 in line with the fuel nozzle end at 60*a* in close proximity to the nozzle. Other passages 60 extending beyond the fuel nozzle and spark plugs end at 60*b* and 60*c* between the side edges of the outer body peripheral wall and fuel nozzle. Still other passages 66 formed in the outer body peripheral wall in line with the fuel nozzle as by electrical discharge machining extend from a location in close proximity to the fuel nozzle, to the passageway 68 which connects the passages 66 with peripheral wall slot 70. Passages 72 formed in the outer body peripheral wall under each of the spark plugs 50 and 52, as in the manner of the passages 66, connect with passages 60 between the cooling fins 58 and a passageway 74 which communicates with a slot 76 in the outer body peripheral wall.

Cooling air is supplied by way of conduit 65 directly to the passages 60 and 66 in the region of the fuel nozzle 48 and spark plugs 50 and 52, and caused to flow throughout that portion of the outer body peripheral wall in which these parts are supported. It is an important feature of the engine that cooling air is supplied to the peripheral wall 12 in the region of the nozzle and spark plugs since it is thereby assured that this difficult-to-cool region of the outer body is exposed to relatively cool air and that suitable temperatures are maintained. Most of the cooling air entering the passages 60 flows from the region of the fuel nozzle and spark plugs circumferentially in the direction of motion of the rotor 28 around the outer body peripheral wall and exhausts from the housing 59 surrounding the fins 58 at 78. However, cooling air entering those passages 60 which connect with the passages 72 and passageway 74, flows under the spark plugs in the opposite direction and exhausts in the slots 76 located on the upstream side of the fuel nozzle and spark plugs. Cooling air entering the passages 66 also flows through connecting passageway 68 in the said opposite direction and exhausts in the slot 70 on the upstream side of the fuel nozzle and spark plugs.

As noted hereinbefore, the fuel nozzle 48 and spark plugs 50 and 52 are located upstream from the lobe junction 56 because satisfactory temperatures of the outer body are more easily maintained there than on the other side of the lobe junction. The extent to which the fuel nozzle and spark plugs can be displaced upstream from the lobe junction 56 is, however, limited by the pressure loss experienced across the apex seals when at the recess 54 into which the nozzle and plugs extend. If the recess 54 is too far upstream, excessive pressure is lost across the apex seals as they move over the recess. In an air-cooled, two-lobed epitrochoidal engine according to the invention having K, as hereinbefore defined, with a value within the range of 6.4 to 7.2, the fuel nozzle and spark plugs are preferably so located that a line extending from the axis 20 to the small recess 54 defines an angle of between 20° and 30° with a line extending through axis 20 and lobe junction 56 (see FIG. 1).

Although only one embodiment of the invention has been shown and described herein, it will be apparent to those skilled in the art that other embodiments might be provided and that various changes and modifications might be made in the engine disclosed without departing from the spirit and scope of the invention as defined in the annexed claims.

What is claimed is:

1. A rotary internal combustion engine having a cycle including the four strokes of intake, compression, expansion and exhaust and comprising an outer hollow body and an inner body supported for relative turning movement within the outer body, and turning on an axis eccentric of and parallel to the axis of the outer body, said bodies having respective facing surfaces defining a plurality of variable volume working chambers, said facing surfaces comprising the outer surface of the inner body and the inner surface of the outer body which includes a plurality of arched lobe-defining portions spaced circumferentially about the axis of the outer body, said outer surface of the inner body including a plurality of apex portions spaced circumferentially about the axis of the inner body, said apex portions including seals which extend parallel to the axis of the inner body and engage the inner surface of the outer body, intake passage means arranged to communicate with the space between the exterior of the inner body and interior of the outer body for successively feeding all said chambers as the bodies relatively move, exhaust passage means also arranged to communicate with said space, a nozzle for spraying fuel into each chamber after intake and before exhaust, and a pair of simultaneously operable spark plugs for igniting the fuel in close proximity to the nozzle, the inner surface of the outer body including a recess into which the discharge end of the fuel nozzle and igniting end of both of the spark plugs extend and wherein ignition of the fuel is initiated, said recess having a volume which is not more than eight percent (8%) of the minimum volume of a working chamber and being disposed to communicate with each chamber during a pre-selected period for the injection of fuel into the chamber while chamber volume is relatively small.

2. A rotary internal combustion engine as defined in claim 1 wherein the fuel nozzle and both spark plugs are located in a common plane parallel to the axis of the rotor.

3. A rotary internal combustion engine as defined in claim 1 wherein the recess into which the fuel nozzle and spark plugs extend is remote from the intake and exhaust ports, and is situated adjacent a lobe junction on the upstream side thereof relative to the direction of rotation of the inner body.

4. A rotary internal combustion engine according to claim 3 with the ratio of $R/e$ having a value within the range of 6.4 to 7.2 where R is the distance from the geometrical axis of the rotor to the rotor vertices, and

*e* is the distance between said geometrical axis of the rotor and the geometrical axis of the inner surface of the outer body.

5. A rotary internal combustion engine according to claim 4 with the recess for the fuel nozzle and spark plugs so located that a line extending from the geometrical axis of the curve of the inner surface of the outer body to the recess defines an angle of between 20° and 30°, with a line extending through such geometrical axis of the curve of said inner surface and the lobe junction adjoining the fuel nozzle and spark plugs.

6. A rotary internal combustion engine as defined in claim 1 wherein the outer body includes cooling fins and passages between the fins in line with the fuel nozzle and extending circumferentially in one direction from the region of the nozzle, and other cooling fins with other passages between such other fins also in line with the fuel nozzle and extending circumferentially in the other direction from the region of the nozzle.

7. A rotary internal combustion engine as defined in claim 6 including means directing cooling air to the perimeter of the outer body in the region of the nozzle to provide for the flow of air through said first mentioned passages in one direction and the flow of air through the other passages in the opposite direction.

8. A rotary internal combustion engine as defined in claim 6 including additional circumferentially extending cooling fins forming passages in the outer body with the nozzle therebetween.

9. A rotary internal combustion engine as defined in claim 8 including means directing cooling air to the perimeter of the outer body in the region of the nozzle and spark plugs to provide for the flow of air through the first mentioned passages in one direction and the flow of air through said other passages and the passages formed by said additional fins in the opposite direction.

10. A rotary internal combustion engine as defined in claim 9 wherein the spark plugs and fuel nozzle are located in a common plane parallel to the axis of the rotor and the nozzle is between the spark plugs, each of which is at an acute angle with respect to the nozzle, and wherein the outer body includes passage means for cooling air extending under the spark plugs and communicating with the passages formed between said additional fins.

References Cited

UNITED STATES PATENTS 3,245,388 4/1966 Froede.
3,246,636 4/1966 Bentele.

RALPH D. BLAKESLEE, *Primary Examiner.*